Dec. 9, 1930.  F. LEICHT  1,784,017
STEERING MECHANISM FOR COASTER WAGONS
Filed May 3, 1929
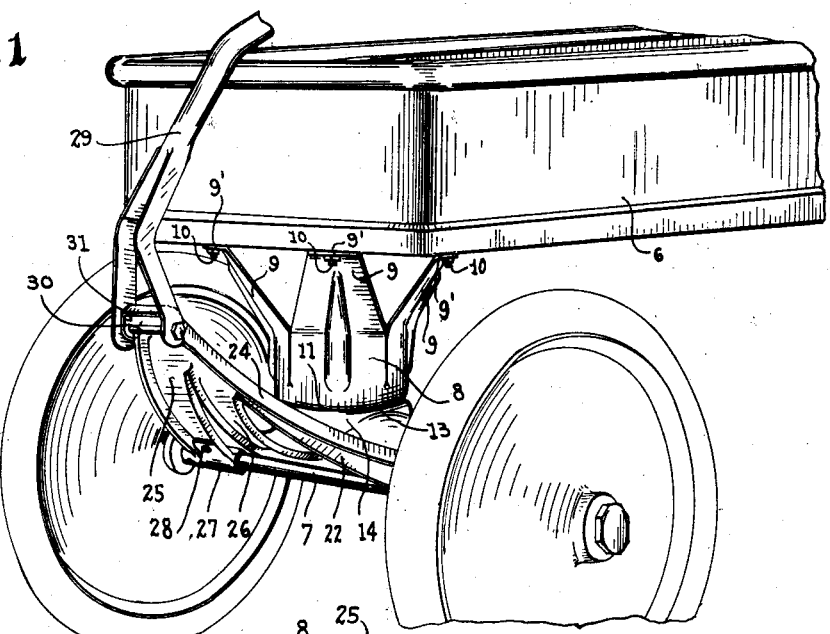
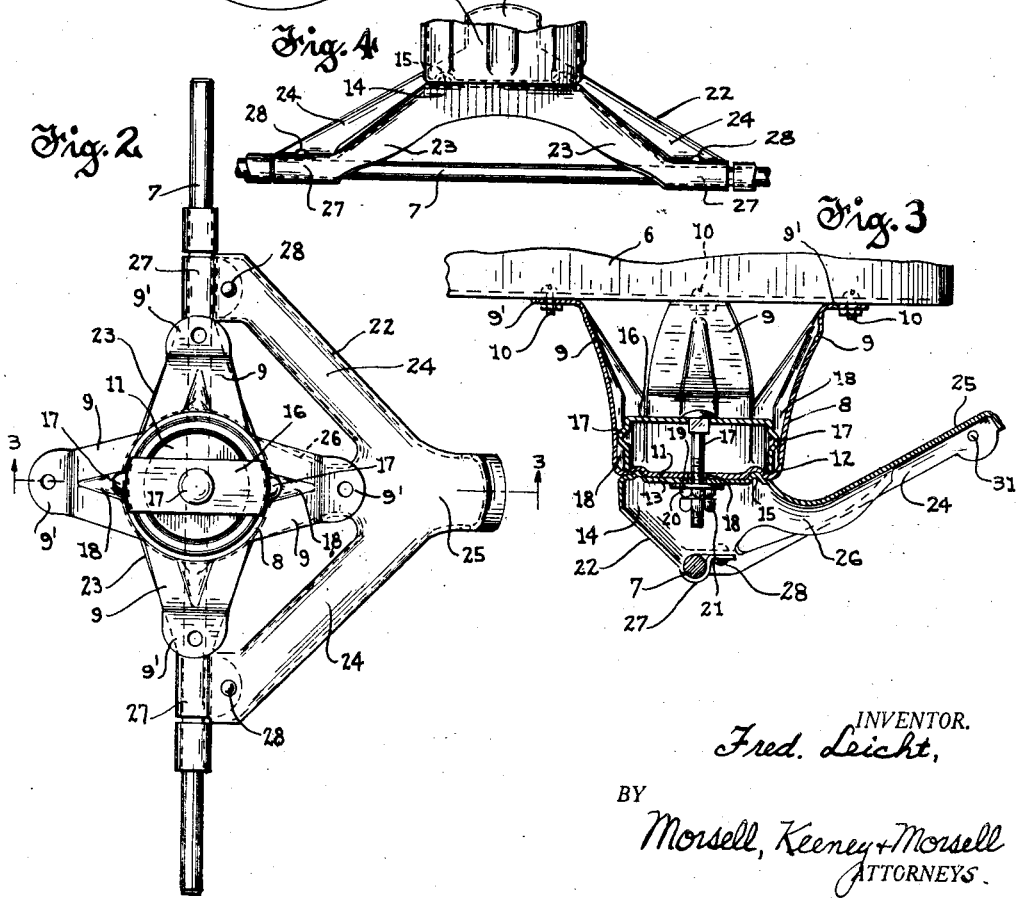
INVENTOR.
Fred. Leicht,
BY Morsell, Keeney & Morsell
ATTORNEYS.

Patented Dec. 9, 1930

1,784,017

UNITED STATES PATENT OFFICE

FRED. LEICHT, OF SHEBOYGAN, WISCONSIN, ASSIGNOR TO THE GLOBE COMPANY, OF SHEBOYGAN, WISCONSIN, A CORPORATION OF WISCONSIN

STEERING MECHANISM FOR COASTER WAGONS

Application filed May 3, 1929. Serial No. 360,219.

This invention relates to improvements in steering mechanisms for coaster wagons, and more particularly to a steering mechanism having a combined bolster and hound.

In the ordinary coaster wagon steering mechanism, the bolster, hound and fifth wheel are all separate members which must be secured together when the steering mechanism is assembled and braces are required.

The present steering mechanism overcomes the above objection by combining in an integral, unitary construction the hound, the lower portion of the bolster, and a fifth wheel section.

A further object of the invention is to provide a steering mechanism in which the upper bolster portion is of cylindrical shape providing extra strength and ease in attaching the same to a wagon box, and also permitting its lower surface to be formed as a complementary fifth wheel member.

A further object of the invention is to provide a steering mechanism in which adjacent surfaces of the two bolster portions are formed round and serve as the fifth wheel, eliminating the need of a separate fifth wheel.

A further object of the invention is to provide a steering mechanism of the turn-table style, having no struts nor braces to interfere with free steering which permits a full half turn of the lower bolster portion whereby a wagon will require less area to make a complete turn than ordinarily.

A further object of the invention is to provide a coaster wagon steering mechanism which is very simple, is strong and durable, is relatively inexpensive, and is well adapted for the purposes described.

With the above and other objects in view the invention consists of the improved coaster wagon steering mechanism, and its parts and combinations as set forth in the claims, and all equivalents thereof.

In the accompanying drawing in which the same reference characters indicate the same parts in all of the views:

Fig. 1 is a fragmentary perspective view of a coaster wagon equipped with the improved steering mechanism;

Fig. 2 is a plan view of the steering mechanism;

Fig. 3 is a sectional view taken on line 3—3 of Fig. 2; and

Fig. 4 is a fragmentary rear view of the steering mechanism.

Referring now more particularly to the drawing it will appear that the numeral 6 indicates the body or box of a coaster wagon and the numeral 7 indicates the front axle mounted below the front end portion of said box.

The present invention resides particularly in the mounting for said front axle, which mounting is interposed between said axle and the lower surface of the front end portion of the box and permits turning movements, for steering, between said front axle and the box.

The upper bolster member 8 of said mounting or steering mechanism has its body portion of cylindrical shape with separated upwardly and outwardly directed strut portions 9 extending therefrom, which portions are formed with angular outer end portions 9' through which bolts 10 are extended, whereby said upper bolster member is dependingly secured to the box, as shown. The lower portion of said upper bolster member is provided with a circular plate portion 11 forming a fifth wheel section, and said plate portion is struck with an annular groove 12.

Disposed immediately below said plate portion 11 of the upper bolster member is a circular plate or fifth wheel portion 13 of a lower bolster member 14 having a struck up annular rib 15 adapted to enter the groove 12 of the plate portion 11. An inverted U-shaped strap member 16 is disposed within the cylindrical portion of the upper bolster member and the side arms of said strap are formed with protuberances 17 which lodge within grooves 18 in opposed inner side portions of the member 8, whereby said strap member 16 is prevented from turning within said bolster member.

To pivotally attach the lower bolster portion 14 to the upper bolster member 8, a king bolt 17 is employed which extends through the medial portion of the strap member 16, and through registering apertures 18 in the medial portions of the fifth wheel portions 11 and 13. The lower end portion of said king bolt carries a washer 19 and bolts 20 and 21.

Integral with the lower bolster portion 14 is a hound 22 having a pair of slightly downwardly and laterally extending portions 23. Also, a pair of slightly upwardly curved and forwardly converging hound arms 24 extend from the outer ends of the portions 23 and merge in a forward hound portion 25 into which portion a central web 26 also merges. The ends of the portions 23 are bent into circular form in cross section as at 27, and the bent portions are so held by screws 28. The front axle 7 is clampingly engaged within said bent portions. The bifurcated inner end portion of the wagon handle 29 is pivotally secured to the outer end of the hound portion 25 by a bolt 30 extending through apertures 31 in the sides of said portion 25.

It will thus be seen that in the improved coaster wagon steering mechanism the adjacent surfaces of the upper and lower bolster portions form the fifth wheel. Also, the lower bolster portion and hound are integral and the assembly of the same with the front axle and with the wagon handle is both simple and strong and the need for bolt holes in the axle is eliminated. The absence of braces and struts in the steering mechanism makes steering safe and easy and permits full half turns of the wagon within small areas. Furthermore, the steering mechanism is simple, strong, and is well adapted for the purposes described.

What is claimed as the invention is:

1. In a steering mechanism, an upper cup shaped bolster member having its lower surface formed as a turn table surface and having integral upwardly projecting box engaging arms, a lower bolster member having an outwardly projecting integral hound portion, laterally depending, integral, axle embracing and clamping portions and an upper turn table surface engaging the turn table surface of the upper bolster member, a bridge member non-rotatably positioned within said cup shaped bolster member, and a pivot bolt extending through the bridge member and through the adjacent turn table surfaces of both bolster members.

2. In a steering mechanism, an upper cup shaped bolster member having its lower surface formed as a turn table surface and having integral angularly upwardly projecting, separated box engaging arms, a lower bolster member having an upwardly and outwardly projecting integral hound portion, laterally depending, integral, axle embracing and clamping portions, and an upper turn table surface engaging the turn table surface of the upper bolster member, an angular bridge member non-rotatably positioned within said cup shaped bolster member, and a pivot bolt extending centrally through said bridge member and centrally through the adjacent turn table surfaces of both bolster members.

3. In combination, a coaster wagon box, an upper bolster member depended from the front under surface thereof and formed with a lower cup shaped portion having an annular, turn table under surface, a lower bolster member having an upper annular turn table surface revolubly engaging said first-mentioned turn table surface, said lower bolster member having integral downwardly, laterally extending arms formed with rolled outer end portions, an axle clampingly held within said rolled outer end portions, said lower bolster member also being formed with an integral forwardly and upwardly projecting hound, a handle pivotally secured to the outer end portion of said hound, an angular bridge member non-rotatably positioned within said cup-shaped portion, and a pivot bolt entirely within the cup shaped portion of the upper bolster member and extending centrally through the bridge member and the turn table surfaces of both bolster members.

In testimony whereof, I affix my signature.

FRED. LEICHT.